United States Patent Office 2,699,429
Patented Jan. 11, 1955

2,699,429

LUBRICATING OIL COMPOSITION

Walter Lowenstein-Lom, Penarth, Glamorganshire, Wales, assignor to Standard Oil Development Company, a corporation of Delaware No Drawing. Application July 31, 1952,
Serial No. 301,993

Claims priority, application Great Britain August 23, 1951

1 Claim. (Cl. 252—49.8)

This invention relates to lubricating oils, and particularly to mineral lubricating oils, having lubricating properties suitable for operation under high bearing loads.

The problems arising from the lubrication of highly loaded bearing surfaces, gear teeth and the like are well known and a great number of suggestions have been made to overcome the deficiencies of mineral oils for this service. In general, these critical conditions arise when the regime of hydrodynamic or fluid film lubrication gives way to boundary conditions. In the former case, the bearing surfaces are separated by a macroscopic layer of lubricant, friction between the surfaces is largely a function of viscosity of the fluid film and the system can be analysed by hydrodynamical theory. In boundary lubrication, the layer of lubricant is microscopic and is, generally, insufficient to prevent contact of asperities on the bearing surfaces. Under these conditions, which pertain when loads are high and/or rubbing speeds are low, friction is largely independent of the viscosity of the lubricant.

It is well known that under conditions of boundary lubrication polar materials may be chosen that are soluble in the lubricant and that adhere tenaciously to the bearing surfaces. Such compounds materially reduce the co-efficient of friction, reduce the wear and sometimes increase the permissible loading before seizure occurs. Thus for any bearing surfaces there are critical conditions of load, rubbing speed and lubricant viscosity which define the frontier between hydrodynamic friction and boundary friction. When boundary friction pertains then polar materials may be chosen to reduce the friction that would be present under the direct surface contact that would occur in the absence of a microscopic lubricating layer. These agents are termed as oiliness agents.

An alternative approach to reduce the friction and wear and to increase the critical loading under boundary conditions is to incorporate in the lubricant a proportion of a compound that is somewhat reactive to the bearing surfaces and that will unite with those surfaces to form layers that have a lower co-efficient of friction or that possesses anti-welding properties. Such additive materials are called film strength improvers.

The present invention is based on the discovery that a combination of additive materials can be made, one an oiliness agent and the other a film strength improver, that exhibit a true synergistic effect. That and the increased load that can be borne by a lubricant containing the two additives is very much higher than predictable from the performance of either alone.

The oiliness agents that may be used according to this invention may be generally chosen from among the well known class of such materials although oil soluble esters of fatty acids and mono- or poly-hydroxy alcohols are preferred. The choice of film strength improver is very much more restricted and only in the case of oil soluble alkyl phosphates has this effect been observed.

Thus this invention comprises a lubricating composition consisting essentially of a major proportion of a lubricating oil together with a minor proportion of a mixture of an oil soluble oiliness agent, preferably a fatty acid ester of an alcohol, and an oil soluble alkyl phosphate.

The lubricating oil that may be used according to this invention is preferably a mineral lubricating oil fraction which may range in viscosity from that of a very light spindle oil to that of a residual cylinder stock. It may be of paraffinic, naphthenic or mixed base and may have been subjected to any or all of the conventional refining steps such as solvent extraction, chemical treatment, dewaxing, deasphalting and adsorbent treatment.

The class of oil soluble oiliness agents is well known to the art and includes materials having long chain lipophilic groups with lipophobic substituents. Preferred for the practice of the present invention are the fatty acid esters of alcohols, particularly monohydric alcohols. Suitable fatty acids include saturated fatty acids such as butyric, capric, lauric, palmitic, stearic, arachidic and cerotic acids and unsaturated acids such as $\Delta^{9,10}$-decanoic, $\Delta^{9,10}$-dodecanoic, palmitoleic, oleic, ricinoleic, linoleic, linolenic, arachidonic, erucic and selacholeic acids. Acids having between 10 and 20 carbon atoms are preferred. Suitable alcohols are the saturated alkanols such as ethanol, n-propanol and isopropanol, n-butanol, s-butanol and t-butanol, and higher homologous alcohols. Mixtures of alcohols may be used and these may be of any of the above alkanols or may be mixtures of alcohols made by such processes as the Oxo process. Preferred alkanols have from 1 to 10 carbon atoms, e. g. isopropanol.

The oil soluble alkyl phosphate is preferably a trialkyl phosphate and, conveniently, the three alkyl groups are the same. Particularly preferred are the phosphates wherein the alkyl groups are saturated and have from 1 to 20, especially 2 to 10 carbon atoms, e. g. tributyl, trihexyl and trioctylphosphates.

The amount of oiliness agent added is normally less than 10% and is preferably between 0.5 and 5.0% by weight of the total composition, e. g. 2% or 3%. The phosphate concentration is preferably below 20% and particularly is between 0.5 and 10% based on the total composition.

The invention may better be appreciated by consideration of the following example, in which the oiliness agent used was iso-propyl oleate and two phosphates were used. One, tributyl phosphate according to the present invention and the other tricresyl phosphate which is a known E. P. additive. The base oil used was a phenol extracted coastal lubricating oil having a viscosity of 83.2 cs. at 100° F. Results presented in Table I give the failure loads on the I. A. E. gear machine. It can be seen that the oiliness agent added alone to the base oil or to a blend of base oil and tricresyl phosphate, slightly reduced the failure load, whereas when it is added in conjunction with tributyl phosphate a considerable increase in failure load results. Table II presents data on a blend comprising the above base oil, 2% by weight of tributyl phosphate and 2% by weight of isopropyl oleate. Here it will be seen that the increased load bearing capacity of this blend has been achieved without seriously impairing other desirable properties such as demulsibility before and after oxidation, foaming and corrosion.

TABLE I

[I. A. E. failure loads at 4,000 R. P. M., 90° C., gears of E. N. 39 steel]

| | |
|---|---|
| Base oil | 35 |
| Base oil+1% O. A.[1] | 30 |
| Base oil+2% O. A.[1] | 27 |
| Base oil+2% T. C. P.[2] | 47 |
| Base oil+2% T. C. P.[2]+0.5% O. A.[1] | 45 |
| Base oil+2% T. P. C.[2]+1.2% O. A.[1] | 40 |
| Base oil+2% T. C. P.[2]+2.0% O. A.[1] | 35 |
| Base oil+2% T. B. P.[3] | 62 |
| Base oil+2% T. B. P.[3]+0.5% O. A.[1] | 70 |
| Base oil+2% T. B. P.[3]+1.2% O. A.[1] | 72 |
| Base oil+2% T. B. P.[3]+2.0% O. A.[1] | 80 |

[1] O. A. is an oiliness agent, isopropyl oleate.
[2] T. C. P. is tricresyl phosphate.
[3] T. B. P. is tributyl phosphate.

TABLE II

*Characteristics of blend of 2% tributyl phosphate and 2% isopropyl oleate in mineral lubricating oil*

|  | Base Oil | Blend |
|---|---|---|
| Acidity mg. KOH/gm | 0.08 | 0.10 |
| Demulsibility, secs | 270 | 300 |
| Copper Corrosion, 3 hrs. at 212° F | 2 | 1 |
| Flash point, °F | 375 | 365 |
| Pour point, °F | −10 | −10 |
| Foaming (C. R. C.-L-12) | pass | pass |
| Kin. visc. at 100° F., cs | 83.2 | 84.15 |
| Viscosity index | 68 | 74½ |
| Acidity after oxidation mg. KOH/gm | 0.09 | 0.20 |
| Demulsibility after oxidation, secs | 1200 | 720 |

Thus, an additional feature of the present combination of additive materials is that they do not display the disadvantages normally associated with the E. P. additives of the prior art, that is, they do not seriously impair other aspects of the lubricating composition in which they are incorporated.

A further advantage has been observed which makes the present invention particularly suitable for turbine oils.

It has been discovered that tributyl phosphate either alone or in the combination of the present invention has a pronounced antifoaming action.

What I claim is:

A lubricating oil composition consisting essentially of a mineral lubricating oil containing dissolved therein about 2% by weight, based on total composition, of isopropyl oleate and about 2% by weight, based on total composition, of tributyl phosphate.

References Cited in the file of this patent

UNITED STATES PATENTS

| | | |
|---|---|---|
| 2,203,102 | Powers | June 4, 1940 |
| 2,485,341 | Wasson | Oct. 18, 1949 |
| 2,486,493 | Revukas | Nov. 1, 1949 |

FOREIGN PATENTS

| | | |
|---|---|---|
| 402,262 | Great Britain | Nov. 30, 1933 |

OTHER REFERENCES

Extreme Pressure Lubricants, by Davey; I. and E. Chem,, vol. 42, No. 9, September, 1950, pages 1841–1847, page 1844 pertinent.